United States Patent [19]

Wildner

[11] Patent Number: 5,076,052
[45] Date of Patent: Dec. 31, 1991

[54] BLOCKING DEVICE FOR FAN RAMJET ENGINES

[75] Inventor: Walter Wildner, Munich, Fed. Rep. of Germany

[73] Assignee: MTU Motoren- und Turbinen Union Muenchen, Fed. Rep. of Germany

[21] Appl. No.: 505,698

[22] Filed: Apr. 5, 1990

[30] Foreign Application Priority Data

Apr. 10, 1989 [DE] Fed. Rep. of Germany ....... 3911715

[51] Int. Cl.$^5$ ............................................. F02K 3/02
[52] U.S. Cl. ..................................... 60/244; 60/270.1
[58] Field of Search .................. 60/224, 225, 270.1, 60/244, 245; 415/150, 157, 158

[56] References Cited

U.S. PATENT DOCUMENTS 4,909,031 3/1990 Grieb ................................. 60/225

Primary Examiner—Louis J. Casaregola
Assistant Examiner—Howard R. Richman
Attorney, Agent, or Firm—Evenson, Wands, Edwards, Lenahan & McKeown

[57] ABSTRACT

First and second axially adjustable rings, each ring having a front and rear end, function together in a telescopic manner for blocking and exposing an annular inflow surface in a combined turboramjet engine. The annular inflow surface is blocked by the device when a basic engine and fan are inoperative to direct ram air through a ring duct to a ramjet combustion chamber. When in an inoperative position, the first and second rings are moved above one another into an intermediate housing with their front ends and a flow divider forming a lug edge and, when in a blocking position of the annular inflow surface, each ring is moved out of the intermediate housing to a different degree. The first ring is moved out farthest and has an end surface mating with the local oblique contour of the front wall.

16 Claims, 6 Drawing Sheets

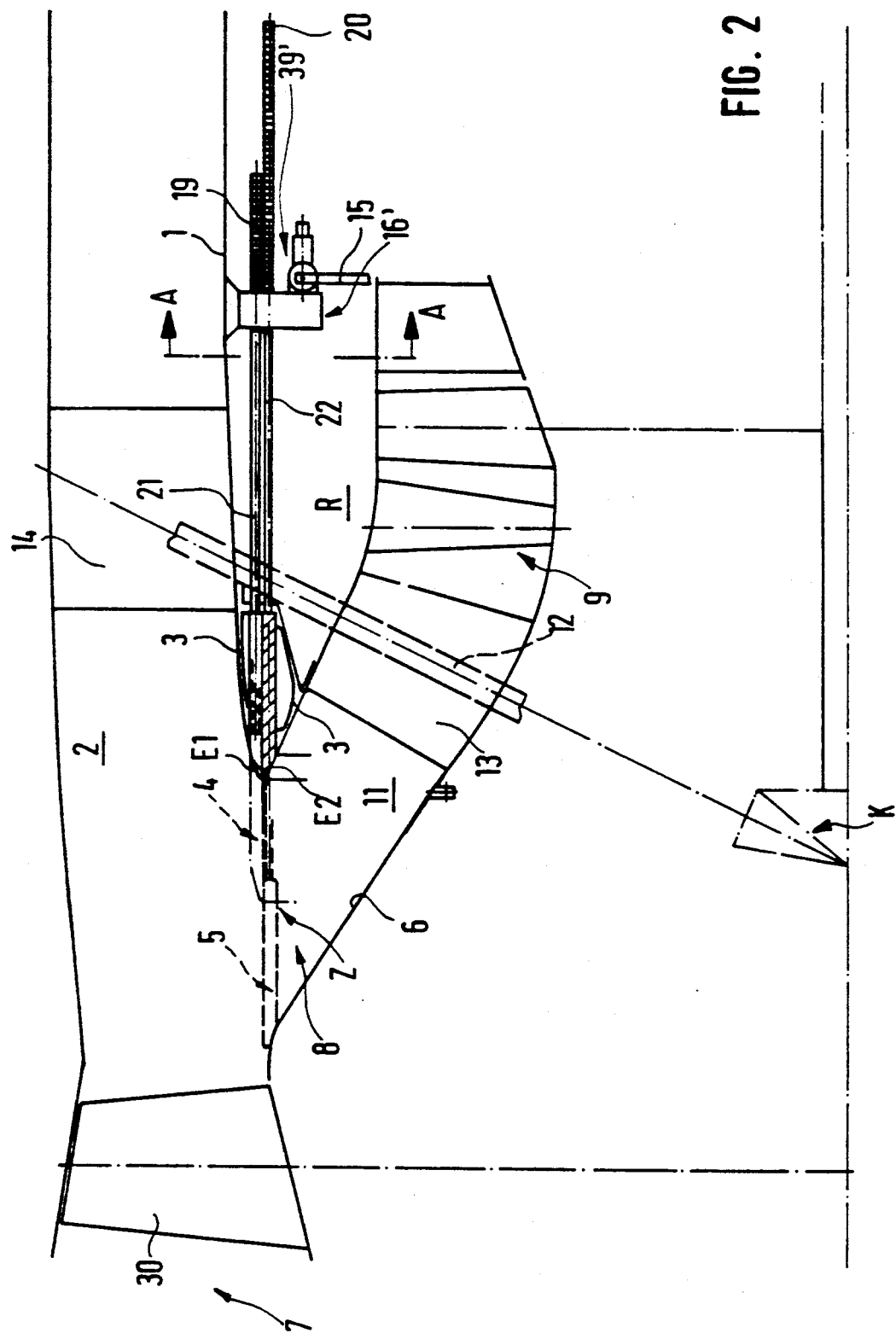

BLOCKING DEVICE FOR FAN RAMJET ENGINES

BACKGROUND AND SUMMARY OF THE INVENTION

The invention relates to a device for the blocking of a cylindrical inflow cross-section which is constructed between an interrupted interior wall of an exterior secondary duct and an interior engine circuit of a turbo fan ramjet engine.

Recently, combined turbine ramjet engines have been regaining importance, specifically within the framework of so-called "supersonic flight concepts" with an extremely high mission spectrum from take off to a high supersonic speed at high flying altitudes (up to an altitude of approximately 30 km). Among other concepts, the hypersonic flight concepts include a space flight equipment concept (Sänger Project) which, as will be described in the following, amounts to a two-stage concept. The first stage is to be carried by a flight apparatus which operates only within the atmosphere, while the second stage is based on a useful-load flight apparatus which is taken along in a "piggyback" manner by the mentioned flight apparatus. The useful-load flight apparatus, for use in space missions, has the purpose of continuing its assigned flight path on its own in the upper range of the atmosphere by way of a suitable rocket propulsion system. The flight apparatus responsible for the first stage must therefore be able to return, must be reusable, and carries out take offs and landings like a conventional airplane.

In the case of combined turbine ramjet engines which are to be used, for example, for a flight apparatus of this type, the turbojet engine must generally be switched off continuously, and the respective ramjet engine must be switched on continuously when a flying speed of approximately Mach 3 is reached in order to reach the desired high supersonic or hypersonic speeds of up to Mach 4.5 or even higher only by means of the ramjet engine. Flying speeds of approximately 2 Mach or even higher may be reached in this case in a combined operation of a "jet engine with a switched-on afterburner". The afterburner which is advantageously connected behind the jet engine part for this purpose and, as necessary, is acted upon by a combination of compressor or fan air and engine exhaust gas, may form the driving system for the ramjet operation by means of the connection of additional fuel injection devices, in addition to flame stabilizers, with a correspondingly apportioned exclusive supply of ambient air when the turbine jet engine part is disconnected.

For the mentioned uses, a combined fan ramjet engine has been suggested having a front fan driven by a basic engine comprising the gas generator, this front fan delivering air into a secondary duct sheathing of the basic engine and thus providing the main propulsive thrust in the subsonic operation. With a correspondingly adapted inlet and propelling nozzle geometry, in the case of the concerned engine, the basic engine with the fan must be switched off or shut down in the hypersonic operation, in which case, the exterior secondary duct will then be acted upon by the necessary ram air which, downstream of the basic engine end, is to be supplied to the supplementary combustion chamber for the ramjet operation.

In this connection, the required blocking devices or device of the basic engine part have a very special significance. In the blocking or locking position of the basic engine during ramjet operation, the basic engine must be impaired as little as possible by the comparatively high temperatures of the ram air (approximately 1,700 degrees C.). This also applies to the blocking devices proper which must be constructed to be correspondingly rugged and reliable. However, at the same time, they must ensure that, for example, in the subsonic operation, a perfect release is possible of the air supply from the fan into the exterior engine circuit (secondary duct) and into the internal engine circuit (basic engine) in correspondingly apportioned quantitative portions.

For this purpose, it may now be suggested to use centrally arranged as well as axially movable annular slides or swivel flaps which had become known in so-called "compound engine concepts" with variable power apportioning, with the purpose of selectively blocking or exposing, for example, a given interior-wall duct breakthrough as well as a, for example, annular inflow duct to the basic engine at the secondary duct—downstream of the fan. The annular slide concept, among other disadvantages, would have disadvantages with respect to relatively long axial adjusting paths as well as with respect to a relatively large installation volume which in many cases is not available for constructive reasons. A relatively large slide volume, in turn, would result in a comparatively high slide weight. The flap concept, among other disadvantages, would have the disadvantage of a relatively complicated construction which is susceptible to disturbances and requires a large amount of space, also with respect to the adjusting mechanism. The flaps, in this case, in a manner similar to propelling nozzles, would reach into or over one another in all positions—as a rotationally symmetrically close composite. Locally absolutely necessary sealing requirements and the mentioned temperature obstacles would also result in considerable technical implementation problems. The large number of different components which, in this case, results in a comparatively high susceptibility to disturbances which, in turn, make it impossible to exclude a comparatively high risk of foreign-body damage to the basic engine, particularly to the high-pressure compressor In addition to the disadvantage of a comparatively high weight, an additional significant disadvantage of both concepts (annular slides or flaps) would be that, in each case, a blocking adjustment would have to take place in a relatively large-surface manner against an existing gas flow so that, in addition to a power-dominating, heavy construction, relatively high driving forces would also have to be applied to the adjustment.

It is an object of the invention to provide a blocking device of the initially mentioned type by means of which, while the construction is reliable, relatively simple and light-weight, a large-surface annular inflow cross-section can be blocked or exposed taking into account the relatively small available installation volumes in the engine.

According to the invention, this object is achieved by blocking device rings which are pushed into one another in an intermediate housing constructed as a flow divider, these rings being axially moved out of the intermediate housing by different distances with mutual surface contact, for the blocking of the inflow cross-section.

By means of utilizing a frequently existing intermediate housing section as a flow divider, the rings can securely be stored above one another and still provide a low length requirement for the installation. For blocking the inflow cross-section, the rings can therefore be axially moved with a relatively low aerodynamic resistance into a locally divided course of the existing compressed-air flow which results in a lighter design of the rings as well as in a relatively low adjusting power requirement.

Furthermore, a driving and adjusting device arrangement which is decentralized with respect to the engine may advantageously be provided, while utilizing ring-shaped installation volumes generally available at the engine side between the secondary and the primary circuit (secondary duct/basic engine).

The invention therefore, for example, offers the advantage that a blocking or closing device for the high-pressure compressor of the basic engine can be achieved without any unnecessary axial lengthening of the engine. The invention can therefore also be used advantageously when only extremely narrow space conditions are available in the engine.

The required displacement of the rings may be carried out by way of several actuating rod linkages which, at the rearward end, are connected to a ball roller spindle. In this case, the nuts of all ball roller spindles are disposed in gears which are connected by a flexible shaft existing along the whole circumference and are driven at one point. The driving may take place pneumatically, hydraulically or by means of an electric motor.

Since, during the same length of time, the closing rings must be moved out by different distances, the ball roller spindles for the respective interior and exterior ring are provided with different slopes.

The possibility also exists according to the invention to drive only the ring having the longest adjusting path and to pull along the respective other ring. For this purpose, the invention provides respective pull-along connecting devices which, in a very general sense, might be described as groove-and-tongue connections; i.e., pins or driving lugs are provided at the respective ring with the longest adjusting path, which can engage in correspondingly assigned axial grooves of the other ring which is to be pulled along.

As a further development of the basic idea of the invention, the respective actuating rod linkages or the compression-tension rods may be sealingly guided in the area of penetration at the intermediate housing wall, so that occurring leakage air can only reach the corresponding interior branch duct of the basic engine.

The ring construction of the blocking device according to the invention is characterized by a small number of components so that the risk of susceptibility to disturbances is low and there is also no danger that component breakages or the like may occur which may have the result that fragments may fly into the high-pressure compressor of the basic engine.

Other objects, advantages and novel features of the present invention will become apparent from the following detailed description of the invention when considered in conjunction with the accompanying drawings.

BRIEF DESCRIPTION OF THE DRAWINGS

FIG. 2 is a schematic sectional view of a first embodiment of the device with a radially exterior engine section which, with respect to parts, is enlarged in comparison to FIG. 1;

FIG. 3 is a view of a second embodiment of the device with a radially exterior engine section which, with respect to parts, is enlarged in comparison to FIG. 1;

DETAILED DESCRIPTION OF THE DRAWINGS

Figure 1:
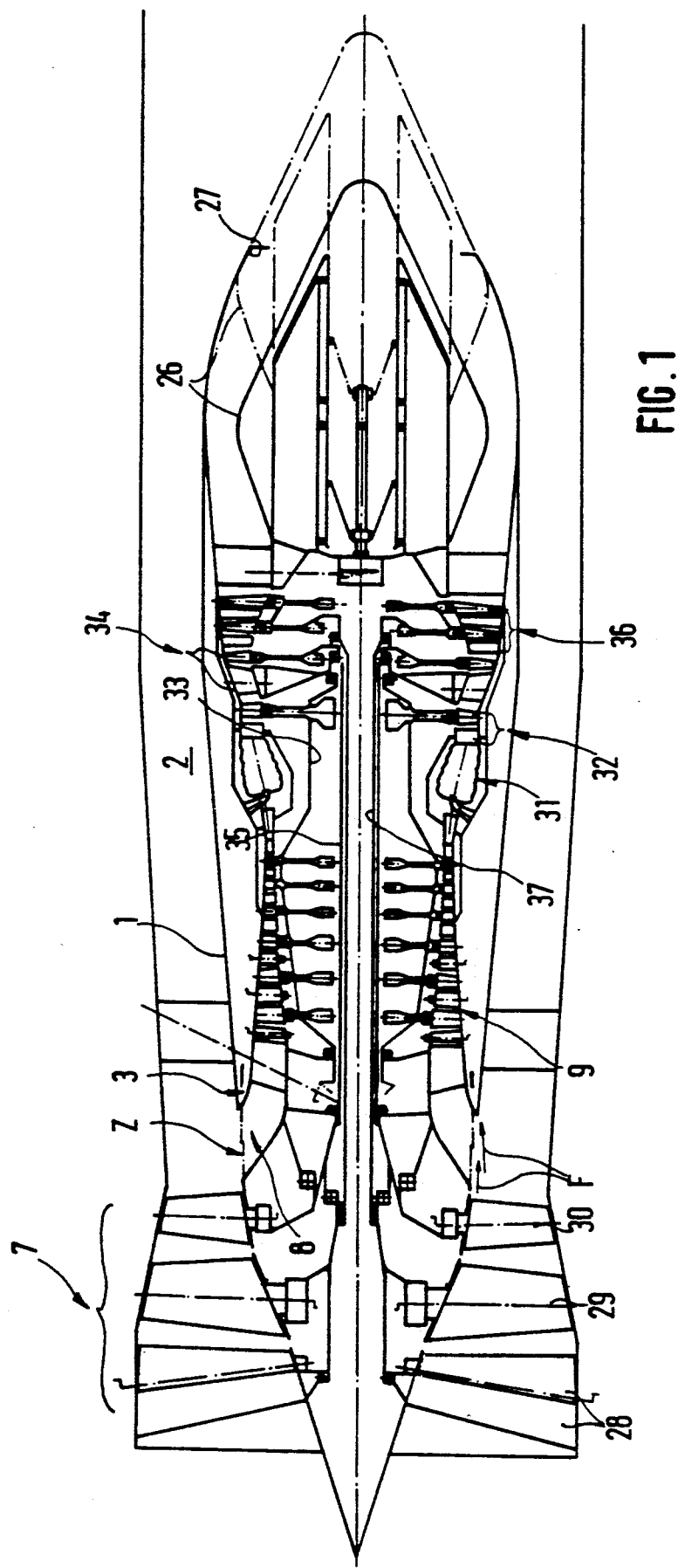
FIG. 1 is a schematic, longitudinal, sectional view of the arrangement of a device at a combined fan ramjet engine, constructed according to a preferred embodiment of the present invention.

FIG. 1, as an example for implementing the device according to the invention, shows a combined fan ramjet engine in a three-shaft construction. This engine comprises, among other components, a front fan 7 with two successive impellers with rotor blades 29, 30 through which the flow moves axially. Combined supporting-aligning blades 29 of the front fan 7 are arranged on the inlet side. The front fan 7, in the subsonic operation and, if necessary, when the afterburner (supersonic flight operation) is switched on, delivers air into an exterior secondary duct 2 sheathing the basic engine and into an inflow cross-section Z exposed by means of the device which will be explained below, into the basic engine. For a sole ramjet operation and while the basic engine including the front fan 7 are shut down, the above-mentioned inflow cross-section Z must be aerodynamically optimally blocked flush with the surface, so that ram air which is collected from the engine inlet which is not shown and thereafter is compressed further, by way of the secondary duct 2, can be supplied to a suitable supplementary combustion chamber. In a manner not shown in detail, the afterburning and supplementary combustion chamber may be formed of fuel injection rings with flame stabilizers connected behind them which, corresponding to the flight mission requirement, can be supplied with fuel more or less by way of the injection rings. This afterburning and supplementary combustion chamber aero-thermodynamically may be arranged downstream of the nozzle-side exhaust gas outlet 27 of the basic engine inside a jet pipe connected behind it with the assignment of a correspondingly variable propelling nozzle. According to FIG. 1, the basic engine also comprises the gas generator which, in turn, comprises—viewed from the left to the right—a multi-stage axial compressor 9, an annular combustion chamber 31 and a single-stage high-pressure turbine 32 which drives the high-pressure compressor 9 by way of a common drum-type shaft 33 of the gas generator. The high-pressure turbine 32 is aerodynamically followed by a single-stage medium-pressure turbine 34 through which the flow passes axially and which, by way of an interior hollow shaft 35, drives the fan part having the blading 30. The basic engine also comprises a dual-step low-pressure turbine 36 which, by way of an additional hollow shaft 37 extending through the hollow shaft 35, drives the remaining front part of the compressor having the rotor blades 29.

As shown more clearly in FIGS. 2 and 3, the blocking device of the inflow cross-section Z according to the invention is constructed and arranged behind the front fan 7 or its last rotor blades 30, at a duct branching 8, between the secondary duct 2 and the corresponding high-pressure compressor 9 of the basic engine. In other words, in this case, the above-mentioned inflow cross-section Z is therefore situated at an interrupted section of the interior wall 1 of the exterior secondary duct 2.

Basically, the blocking device (FIG. 2) according to the invention therefore comprises two rings 4, 5 which, in the inoperative position, are pushed together in an intermediate housing 3 constructed as a flow divider. For the blocking of the inflow cross-section Z the two rings 4, 5 are axially moved out of the intermediate housing 3 by different distances, while contacting their mutual surfaces. The moved-out position of the two intermediate rings 4, 5 is indicated by an interrupted line contour, for example, in FIG. 2. As also shown in FIG. 2, in the effective blocking position, the interior ring 5 which has axially moved out the farthest, in each case, must have moved against a correspondingly sloped exterior end surface of a stationary duct wall 6 by means of a sloped end surface. In this manner, a smooth-surface aerodynamic transition from the secondary duct 2 into the branching 8 is ensured at the corresponding blocking point. According to FIG. 2, it is also particularly advantageous for the rings 4, 5, in their telescoped inoperative position, inside the concerned housing section 3, with one group of their two ends E1, E2 and together with the adjacent surface sections of the intermediate housing 3, to form a lug edge of the flow divider which aerodynamically is closed off in an optimal manner.

FIG. 2 also shows a shaft 12 (starter shaft) of an engine apparatus support which is arranged directly behind the intermediate housing 3 containing the rings 4, 5. This shaft 12 extends obliquely from the front inside to the rear outside through a supporting blade 13 at the high-pressure compressor inlet, then through a section of an annulus R as well as further through a supporting blade 14 penetrating the secondary duct 2. In particular in view of such a shaft 12, a relatively small installation volume is obtained which is available particularly axially for a device operating according to the invention which therefore meets the necessary requirements with respect to an extremely small, preferably axial installation volume (in this respect, see particularly storage position in the housing section 3). The above-mentioned shaft 12 may be connected with a central miter gear K which is outlined schematically in FIGS. 2 and 3.

While otherwise the construction is basically the same, FIG. 3 embodies a modification of FIG. 2 to the extent that the two rings 4', 5', in the telescoped inoperative position form a locally graduated diagonal profile as the flow divider with one group of their two ends E1', E2', together with the adjacent surface sections of the pertaining intermediate housing 3'.

For implementing the invention within the scope of the embodiments according to FIGS. 2 and 3 the rings 4, 5 and 4', 5' are simultaneously driven at different adjusting speeds.

Figure 4:
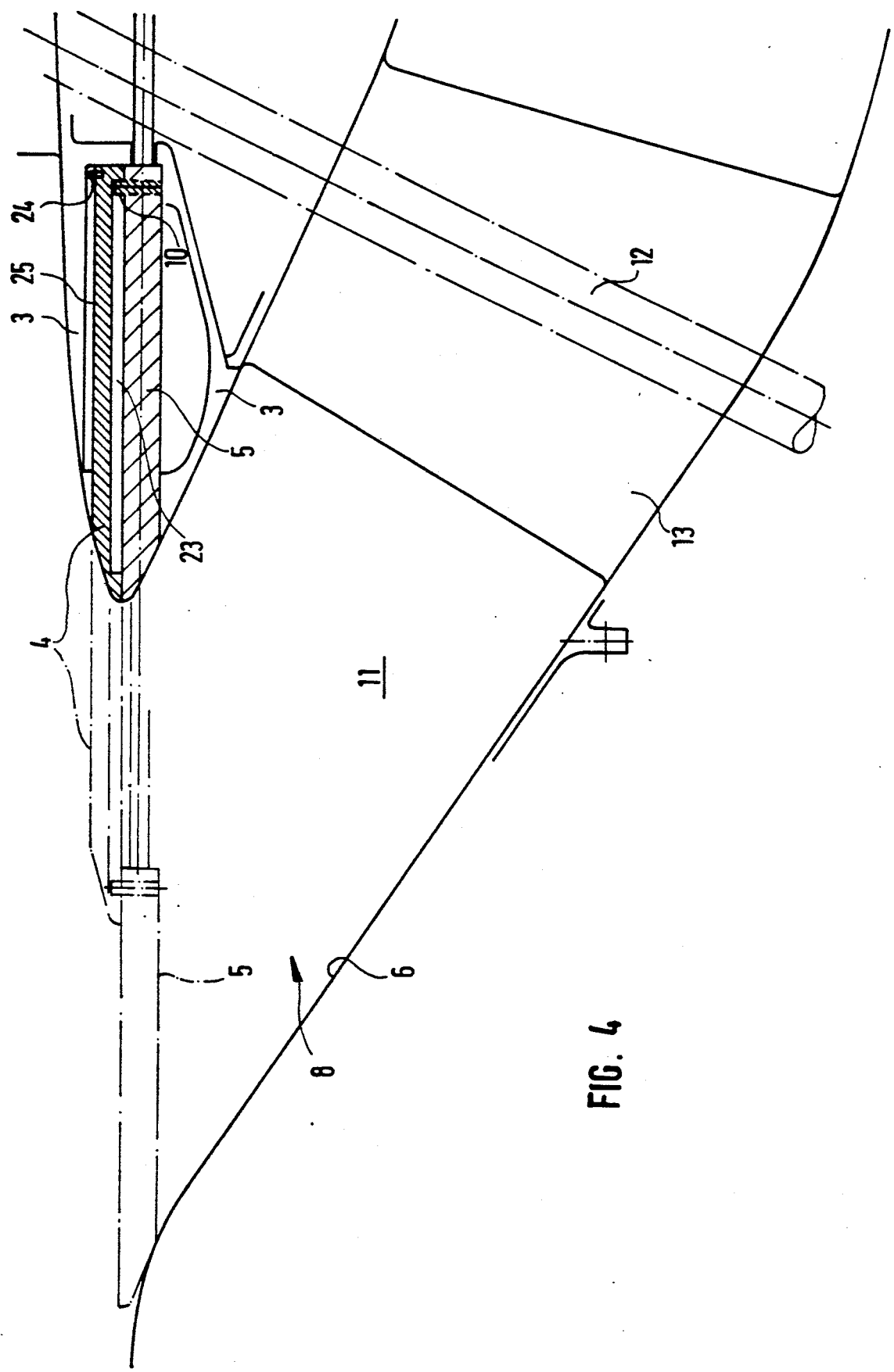
FIG. 4 is a view of a third embodiment of the invention based on essential characteristics of FIG. 2, however, basically as a further modification of FIG. 2 and 3 as a "ring pull-along" variant within the framework of a radially outside partial cutout of the engine which is significantly enlarged in comparison to FIG. 1.

In comparison to the embodiments according to FIGS. 2 and 3, FIG. 4, in particular, represents another basic modification of the device in that the ring 5 which is radially on the inside with respect to the exterior secondary duct 2 and which, during the axial adjustment, must cover the longest moving path, is the only ring subjected to a driving adjustment. This radially interior ring 5 subjects the remaining exterior ring 4 to a pull-along movement by way of a groove-and-tongue connection or by way of a groove-and-pin connection 23, 10.

In addition, it is clearly shown in FIGS. 2, 3 and 4 that the sloped end of the duct wall 6 is a component of the respective duct branching 8 which forms an annular air inflow duct 11 of the high-pressure compressor 9 of the basic engine which is sloped from the top exterior to the bottom interior in the direction of the engine axis with respect to the course of the secondary duct.

Figure 5:
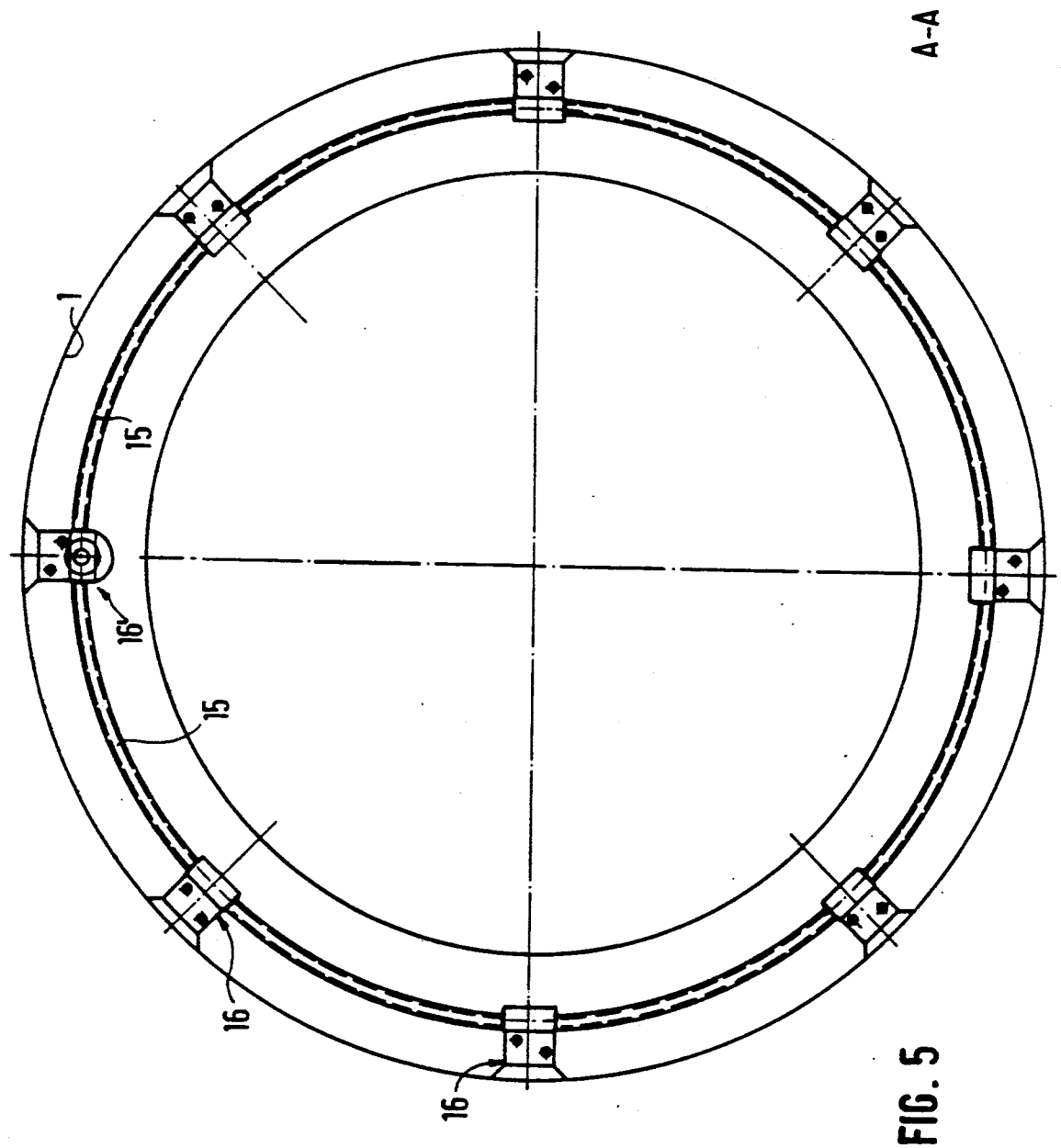
FIG. 5 is a local overall circumferential sectional view taken along section A—A of FIG. 2, detailing the driving and adjusting system of both rings.

According to FIG. 5, the adjusting force for a ring, for example 5 (FIG. 4) or, for example, for both rings 4, 5 according to FIG. 2 can be transmitted over the circumference of engine housing section by means of a bendable shaft 15 or sections of this shaft 15, to several adjusting gears 16 and 16' which are arranged to be uniformly distributed over the respective housing circumference. The mentioned adjusting gears 16 and 16' may drive nuts 17, 18 of ball roller spindles 19, 20 which are rotatably disposed in them and which, by way of pressure-tension rods 21 and 22 (FIG. 2 and 3) are to act separately on the two rings 4, 5 and 4'5' respectively. By means of a different pitch of the concerned spindles 19 and 20, the rings may be provided with desirable different axially adjusting speeds.

Figure 6:
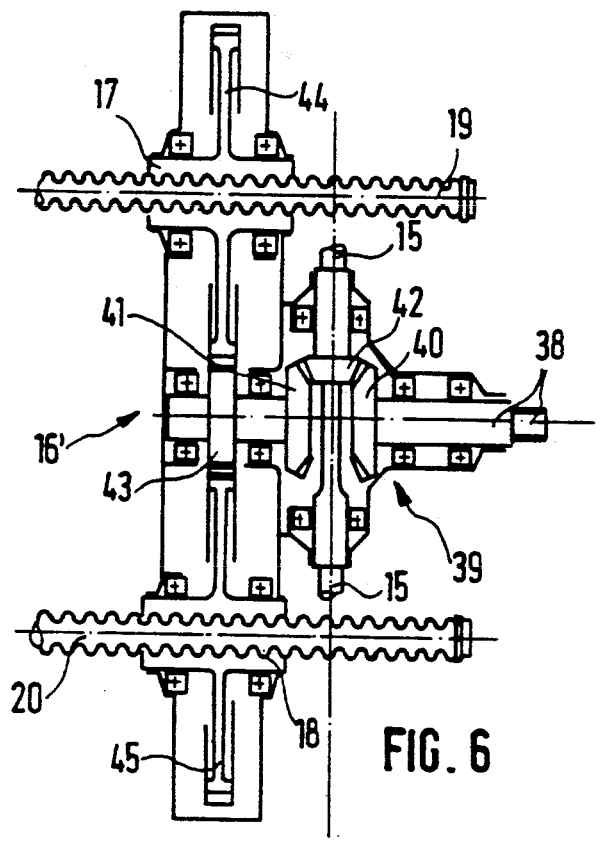
FIG. 6 is a view of an adjusting gear which, for a simpler representation, is projected into the plane of the drawing here with an adapter gear introducing and distributing the driving power, as a sectional representation on the side of the housing in order to clarify some details.

FIG. 6 embodies clearer details of a schematically outlined adjusting gear 16', specifically of that adjusting gear which is equipped in combination with an adapted gear 39 which introduces and distributes the driving power from shaft 38. According to FIG. 6, the motor-driven shaft 38 therefore transmits the complete driving power, by way of bevel-crown-type toothed wheels 40, 41, 42, on the one hand, to a toothed wheel 43 which is centrally disposed in the adjusting gear 16' and which, on both sides, meshes with toothed wheels 44 and 45, which sit on the respective nuts 17 and 18 of the ball roller spindles 19 and 20 and adjust the latter. The above-mentioned exterior toothed wheels 44 and 45, by means of nuts 17 and 18, are each separately rotatable in the circumferential direction, disposed at parallel mutual distances at the housing of the adjusting gear 16'. By way of the above-mentioned adapting gear 39 or central adapting gear, a power distribution takes place on both sides in the circumferential direction and a driving, by way of bendable shafts 15, to, in each case, two other adjacent adjusting gears 16 (see also FIG. 7).

Figure 7:
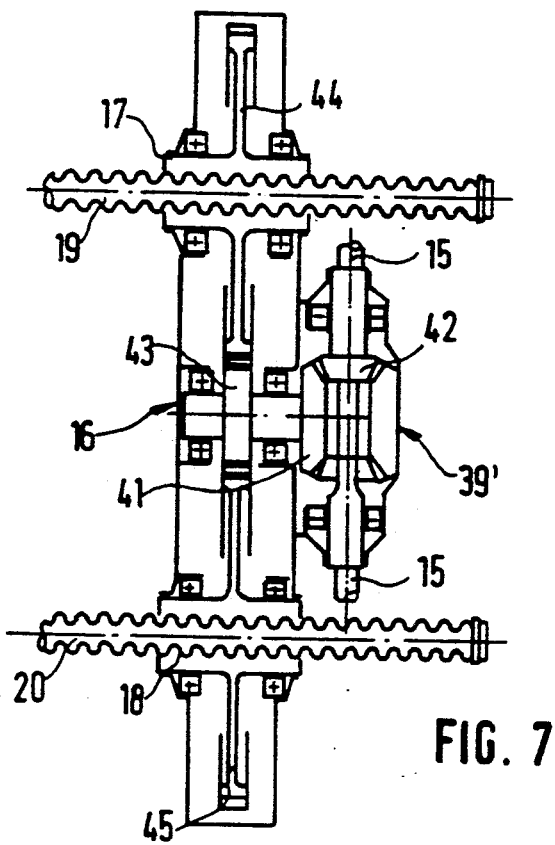
FIG. 7 is a sectional representation predominantly on the side of the housing which here is also projected into the plane of the drawing, of one of several adjusting gears, according to FIG. 5, uniformly arranged along the circumference of the housing with a local distributor gear to two adjacent adjusting gears of this type.
Figure 6:
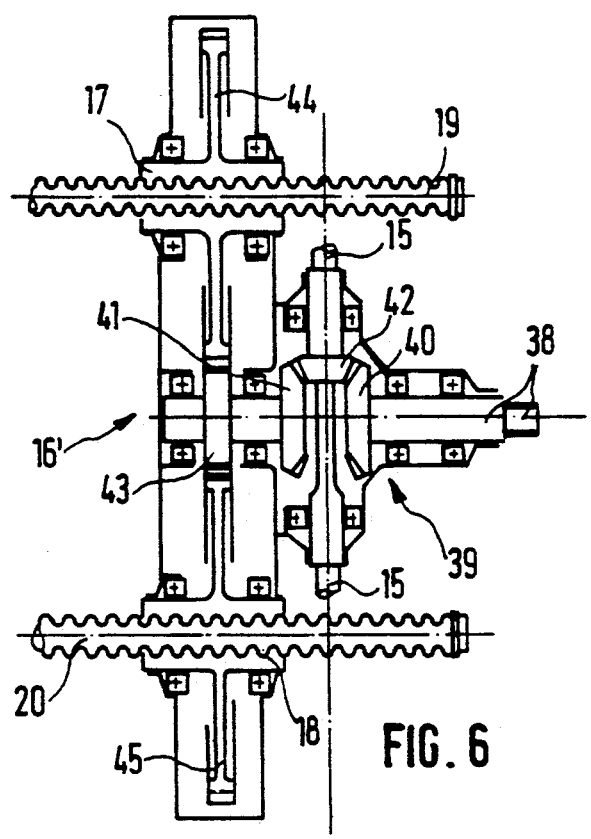
Figure 7:
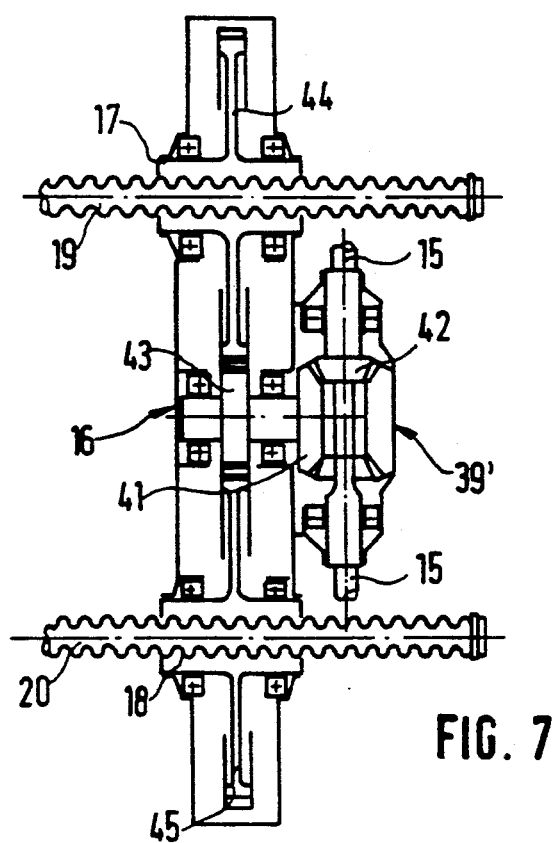

Compared to the configuration of the adjusting gear 16' according to FIG. 6, all other adjusting gears 16 differ, for example, according to FIG. 7, in that a gear adapter part 39' is provided which has a reduced size. By means of this adapter part 39', only a power transmission on the side of the circumference takes place to the individual gears 16, in that the main driving power fed by means of the adjusting gear 16' discussed above in FIG. 6, by way of the sections of the bendable shaft 15 which are correspondingly adjacent to the circumference side and by way of the toothed wheel pairing 41, 42 relevant with respect to FIG. 6, is correspondingly transmitted further to the central toothed wheel 43, etc.

FIGS. 2 and 3 also show clearly that the adjusting gear 16' which had been discussed and explained more clearly with respect to FIG. 6, as also the other adjusting gears 16 in which the ball roller spindles 19, 29 are in each case disposed extending approximately in parallel to the engine axis, are arranged preferably at a housing section of the engine which is part of the interior wall 1 of the secondary duct 2.

FIGS. 2 and 3 also show that the drive and the adjusting devices of the two rings 4, 5 and 4', 5' are arranged inside an annulus R between the exterior secondary duct 2 and the basic engine, in this case, particularly the high-pressure compressor 9 of the basic engine.

In a more detailed discussion of FIG. 4, it would still have to be noted that, in the case of this embodiment, axial guide grooves 23 are provided in the radially exterior ring 4 on its one side which end at its upstream and downstream side. Springs situated at the downstream end of the radially interior ring 5 or, in the illustrated case, pins 10, engage movably for the moving-out or locking of the remaining ring 4 for the purpose of a common inoperative position.

In addition, according to FIG. 4, the remaining ring 4, on the side facing away from the radially interior ring 5, may be arranged to be movable by means of springs or, as shown, by means of pins 10 in guiding grooves, which are boundaries of the axial moving-out distance, of the intermediate housing constructed as the flow divider.

Particularly, with respect to the engine concept according to FIG. 1, it should be mentioned that the previously addressed blocking device formed of rings may be provided in combination with an axially movable mushroom-shaped slide 26 which is axially symmetrically connected behind the basic engine. During an exclusive ramjet operation, the mentioned slide 26 can block off an annular nozzle outlet opening 27 of the basic engine with respect to the ram air flow which, in this case, flows in downstream of the slide from the secondary duct 2. The mentioned blocking position is indicated by a dash-dotted line, while the completely open position of the nozzle opening developed opposite the slide 26 is shown by the slide position indicated by drawn-out/solid lines. The mentioned slide 26 essentially has a contour which increases in the flow direction and then decreases in a conical manner and which in a very general sense may be considered to be drop-shaped. In this case, a central drive may be provided for the slide 26, miter gears driving a central longitudinal screw provided with a thread on which nuts are in turn disposed which, as a result of the turning motion of the longitudinal screw, can be moved axially back and forth and with local struttings axially adjustably act upon the interior side of the slide 26. In this case, it would be expedient to synchronously coordinate the blocking of the inflow cross-section Z by means of the respective rings, such as 4, 5, with the adjustment of the above-mentioned slide 26 in order to permit a continuous blocking of the basic engine on the front and the rear side with the same timing.

In view of the initially mentioned temperature-caused stress (up to approximately 1,700 degrees C.) which occurs during the ramjet operation, it is also provided according to the invention that the rings 4, 5 and 4', 5' in the blocking position and when the engine is switched to ramjet operation may be cooled by air of the appropriate pressure bled from the engine inlet, preferably in the manner of a film cooling. The required cooling temperature of the bled air may be obtained by way of a heat exchange process of this bled air with the fuel which is carried along, such as hydrogen. The above-mentioned cooling film development along the two fully extended rings 4, 5, is shown, for example, on the bottom of FIG. 1, by means of the arrows F. Since the blades 28, 29 and 30 of the fan 7 must also be cooled in the ramjet operation, it would be conceivable that, for example, a part of the cooling air which is used for the cooling of the last row or rotor blades 30 of the fan 7 is blown away from these blades on the interior side and is blown out against the respective rings 4, 5 of the blocking device.

Within the scope of the basic idea of the invention, the blocking device with the respective rings, such as 4, 5, may also be described as being of a connecting link type.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A device for blocking and exposing an annular inflow surface in a combined turboramjet engine having an engine inlet, including a basic turbo engine of an internal engine circuit having an airflow duct with a front wall having a local oblique contour, an intermediate housing functioning as a flow divider having a lug edge, said inflow duct formed between the front wall and the intermediate housing, a ring duct of an external secondary circuit having an interior wall and an exterior wall, the external secondary circuit including a ramjet combustion chamber, a fan driven by the internal engine circuit for delivering fan air into said ring duct and said annular inflow surface, wherein said annular inflow surface is located between the front wall and the lug edge at an opening in said interior wall forming an inlet for said inflow duct, said annular inflow surface being blocked by the device when the basic engine and fan are inoperative to direct ram air through said ring duct to the ramjet combustion chamber, wherein the device comprises at least first and second axially adjustable rings, each ring having a front and rear end, functioning together in a telescopic manner such that when in an inoperative position, the first and second rings are moved into said intermediate housing above one another with the front ends and said flow divider forming the lug edge and, when in a blocking position of the annular inflow surface, each ring being moved out of the intermediate housing to a different degree, said first ring being moved out farthest and having an end surface mating with said local oblique contour of said front wall.

2. A device according to claim 1, wherein the blocking device is constructed and arranged behind a front compressor fan of the engine at a duct branching between the ring duct and a high-pressure compressor of the interior engine circuit.

3. A device according to claim 1, wherein the first and second rings are simultaneously driven at different adjusting speeds.

4. A device according to claim 3, wherein an adjusting force for moving the first and second rings is transmitted from one point by means of a flexible shaft to several adjusting gears uniformly distributed in a circumferential manner around a cross-section of the combined turboramjet engine, further comprising, nuts having ball roller spindles rotatably disposed in the nuts, said nuts being driven by the adjusting gears, each nut and ball roller spindle separately acting upon one of said first and second rings.

5. A device according to claim 1, further comprising an annuls (R) between the ring duct and the interior engine circuit; and a drive and adjusting device system for moving at least one of said first and second rings being arranged inside of said annular.

6. A device according to claim 4, wherein the adjusting gears in which the ball roller spindles are each disposed extend approximately in parallel with respect to the engine axis and are arranged at a housing section of the engine which is part of the interior wall of the ring duct.

7. A device according to claim 1, further comprising an axially movable slide being divergently/convergently shaped in a downstream direction, said slide being connected behind the basic engine symmetrically with respect to the engine axis, wherein during an exclusive ramjet operation, said slide blocks an annular nozzle outlet opening of the basic turbo engine with respect to the ram air flow which flows together from the ring duct downstream of the slide.

8. A device according to claim 1, wherein in the blocked position and when the engine is switched to ramjet operation, said first and second rings are cooled by means of air having an appropriate pressure and temperature level, said air being bled from the engine inlet in the manner of a cooling film.

9. A device according to claim 8, wherein the required cooling temperature of the bled air is obtained by way of a heat exchange process of the bled air with the fuel that is carried along, such as hydrogen.

10. A device according to claim 2, wherein a sloped end of the front wall is a component of the duct branching which forms said inflow duct for the high-pressure compressor of the interior engine circuit, said inflow duct being sloped from the exterior top to the interior bottom in the downstream direction of the engine axis.

11. A device according to claim 10, wherein a drive shaft, extending diagonally from the interior front to the exterior rear of the engine, of an engine apparatus support is arranged directly behind the intermediate housing containing the rings, said drive shaft being guided through a supporting blade at the high-pressure compressor inlet, through a section of the annulus (R) and further through a supporting blade penetrating the ring duct.

12. A device according to claim 1, wherein mechanical adjusting devices such as tension-pressure rods for the first and second rings, are sealingly guided through corresponding wall sections of the intermediate housing.

13. A device according to claim 2, wherein the rings in their telescoped inoperative position from a lug edge of the flow divider which aerodynamically is closed in an optimum manner with one group of their ends (E1, E2) together with adjacent surface portions of the intermediate housing.

14. A device according to claim 1, wherein the blocking device is constructed and arranged behind a front compressor fan of the engine at a duct branching between the ring duct and a high-pressure compressor of the interior engine circuit.

15. A device according to claim 5, wherein the adjusting gears in which the ball roller spindles are each disposed extend approximately in parallel with respect to the engine axis and are arranged at a housing section of the engine pertaining to the interior wall of the ring duct.

16. A device according to claim 2, further comprising axially movable mushroom-shaped slide which is axially symmetrically connected behind the basic engine, this slide, during an exclusive ramjet operation, blocking an annular nozzle outlet opening of the basic engine with respect to the ram air flow which flows together from the ring duct downstream of the slide.

* * * * *